United States Patent [19]
Kuenzig et al.

[11] 3,811,334
[45] May 21, 1974

[54] CHAIN CONSTRUCTION
[75] Inventors: Fred J. Kuenzig, Weatogue; Joseph V. Montano, West Hartford, both of Conn.
[73] Assignee: Jeffrey Galion Inc., Columbus, Ohio
[22] Filed: June 8, 1972
[21] Appl. No.: 261,087

[52] U.S. Cl............................................ 74/251 R
[51] Int. Cl........................................... F16g 13/02
[58] Field of Search ...................... 74/251 R, 245 R

[56] References Cited
UNITED STATES PATENTS
2,553,646  5/1951  Field ............................ 74/251 R X
3,379,072  4/1968  Kuntzmann ...................... 74/251 R Primary Examiner—Leonard H. Gerin
Attorney, Agent, or Firm—David Young

[57] ABSTRACT

The chain, and its method of construction, involves the insertion of a bushing in the opposed apertures of a pair of opposed chain link plates such that there is not only an interference fit between the bushing and the link plate, but also so that the bushing extends outwardly of the link plate. It may be flanged over thereabout, as by spinning, to thereby form a 360° rim. Links are thus formed, by a pair of link plates and a pair of bushings. When such links are interconnected into a continuous chain, by additional link plates and pins which pass through the bushings the rims and/or the bushing extensions automatically provide a space between the adjacent and overlapping link plates.

18 Claims, 5 Drawing Figures

PATENTED MAY 21 1974  3,811,334

CHAIN CONSTRUCTION

BACKGROUND OF THE INVENTION—FIELD OF APPLICATION

This invention relates to chains, and the method of construction and assembly thereof, and more particularly to the construction and assembly of link, and roller link, chain.

BACKGROUND OF INVENTION—DESCRIPTION OF PRIOR ART

Link chain, and roller link chain, has found extensive application in industrial and commercial uses, in farm and domestic machinery, and in many appliances and vehicles including bicycles and motorcycles. Link chain has a long history of use for the transmission of power and in various conveying and elevating operations.

The conventional link chain includes a pair of spaced parallel side bars or link plates interconnected by a pair of bushings. For roller link chain a roller is disposed about each bushing. The interconnected link plates and bushings (and rollers where used) is usually referred to as a link assembly primary link assembly or roller block. A plurality of such link assemblies are conventionally interconnected into a chain by the use of pin, or secondary, links each of which include a pair of link plates and a pair of pins. One pin of the secondary link passes through the bushing of one primary link assembly, and the other pin of the secondary link passes through the bushing of the next primary link assembly to form chain with adjacent and overlapping link plates.

Conventionally, bushings are interconnected at the ends of their respective link plates by press fit. Various other methods such as flaring (as shown in U.S. Pat. No. 2,431,764), swagging (as shown in U.S. Pat. No. 3,426,522), brazing (as shown in U.S. Pat. No. 3,512,356) and the like are also used. However, in may instances a separation will still occur between the bushing and plate.

Thus the interconnection of bushings and link plates, to form the primary link, has long presented problems. Separation of the bushing form the link plate can have disasterous effects; especially if a primary link plate walks outwardly, as it often does in case of sprocket misalignment, and binds against an immediate adjacent secondary link plate to form a "kink" in the chain.

SUMMARY OF THE INVENTION

It is therefore an object of this invention to provide a new and improved chain link.

It is a further object to provide a new and improved chain.

Another object is to provide a new and improved method for making chain links and chain.

A still further object is to provide a new and improved interconnection between the bushings and link plates of a chain link.

Yet another object is to provide a new and improved relationship between the interconnected primary and secondary links of a link chain.

This invention involves the interconnection of bushings and link plates to form primary chain links and the interconnection of such primary links with secondary links to form chain; and contemplates interconnecting the bushing and link plates not only so that there will be no relative movement therebetween but also so that the bushings extend outwardly of the link plates and may be headed thereabout to form rims about the link plate apertures. When the primary links so constructed are assembled with secondary links to form chain, the rims and/or extended parts of the bushings automatically space the link plates of the primary links and the link plates of the secondary links and prevent interference therebetween, even if a primary link plate should become loose from its bushing.

Other objects, features, and advantages of the invention in its details of construction and arrangement of parts will be seen from the above, from the following description of the preferred embodiment when considered in conjunction with the drawings and from the appended claims.

DESCRIPTION OF THE PREFERRED EMBODIMENT

For convenience, the invention will be described as applied to a length of single strand roller chain having non-offset link plates and wherein the extremeties of the bushings which extend beyond the link plates are subjected to a spinning operation to provide a rim or flange about the link plate openings; it being understood, nevertheless, that without departing from the scope of this invention that the chain may be multiple strand, that it need not include rollers, that it may incorporate offset link plates, and that the rim or flange may be formed on the bushings by other appropriate means or may be left off completely.

Figure 1:
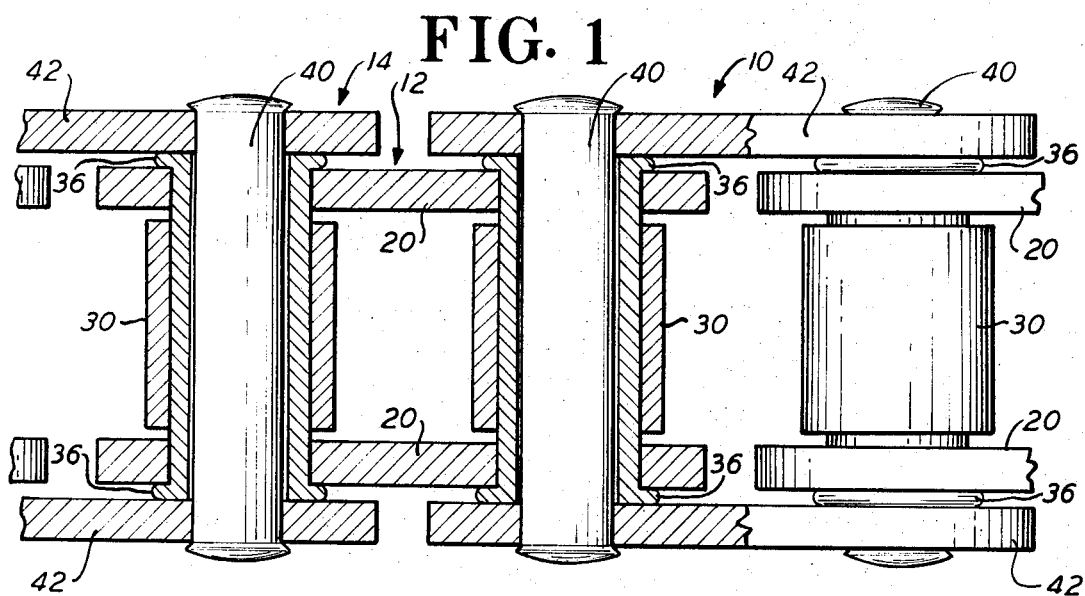
FIG. 1 is a plan view of a section of chain incorporating the instant invention and in partial section to better show details thereof.

With reference to FIG. 1 there is shown at 10 a length of chain formed from a plurality of primary or roller link assemblies 12, and a plurality of secondary or pin link assemblies 14.

Each roller link assembly 12 includes a pair of primary or roller link plates 20 fixedly interconnected in spaced relationship by a pair of bushings 24 about which are freely and rotatably disposed rollers 30.

The outside diameter of bushings 24 is such as to rotatably accomodate rollers 30, while at the same having an interference fit with the inside walls of apertures 32 formed in link plates 20. The length of bushings 24 is such that the extremeties of bushings 24 will extend outwardly beyond both link plates 20 when bushings 24 and link plates 20 are assembled together. Such extremeties may be thereafter flowed over and outwardly at substantially right angles to the longitudinal axis of bushings 24 to form a rim or flange 36. It is preferred to form flange 36 by a spinning operation and in such a way that it completely and continuously surrounds aperture 32 of link plate 20. It is however within this concept to form flange 36 by any other suitable process such as swagging, rolling, peening, hammering, etc; and to form same either so as to substantially surround aperture 32, to be discontinuous with respect to such aperture 32, to be in the form of a plurality of fingers about aperture 32, or in any other manner to extend from bushing 24 about the edge of the aperture 32 so as to form a flange or rim like structure thereabout.

The inside diameter of bushings 24 is such as to freely and rotatably accomodate pins 40 of pin link plates 42 of secondary or pin link assemblies 14. When assembled together pin link plates 42 are disposed outside of roller link plates 20 and so as to overlap two adjacent roller link assemblies 12; with one pin 40 of a particular pin link assembly 14 extending through bushing 24 of one roller link assembly 12 and the other pin 40 of said pin link assembly 14 extending through bushing 24 of the next adjacent roller link assembly 12. The ends of pins 40 are then headed by any suitable process, or otherwise secured against separation from link plates 42 to thus form a continuous chain 10 as shown in FIG. 1.

It should be noted that flanges 36 and/or the extensions of bushings 24 provide a space between link plate 20 and adjacent link plates 42. This space can prove advantageous for many purposes including the oiling of the link plate surfaces should same be necessary. The provision of such space may however obviate the need for such oiling as would be required in chain without such space and wherein the link plate surfaces would otherwise rub upon one another.

Flanges 36 positively prevents link plates 20 from moving towards their adjacent link plates 42 (a common occurrence in conventional chain when sprockets misalign) and forming in chain 10 a "kink" which will prevent chain 10 from articulating about the axis of one or more pins 40 proximate such "kink".

Figures 2, 4:
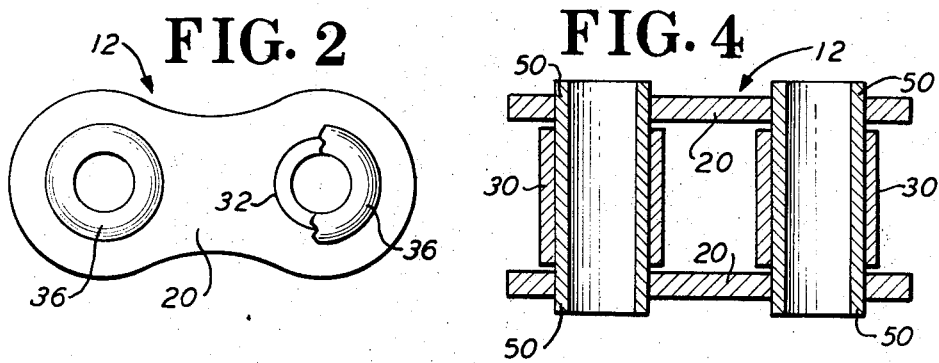
FIG. 2 is a plan view of a primary link assembly of the chain of FIG. 1 cut away in part to better show the details thereof.
FIG. 4 is a sectional view of a primary link assembly after the first step of fabrication according to FIG. 3.
Figure 3:
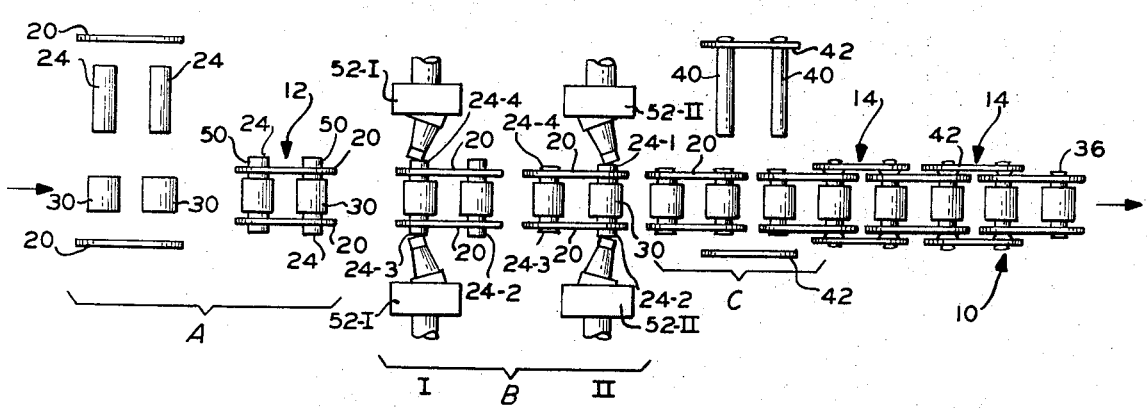
FIG. 3 is a schematic illustration of the steps involved in fabricating the chain of FIG. 1.

In the manufacture of chain 10 a pair of link plates 20, a pair of bushings 24 and a pair of rollers 30 are first assembled together (FIGS. 3 and 4) so that rollers 30 are disposed about bushings 24. Bushings 24 are assembled with an interference fit within apertures 32 of link plates 20, and with the extremeties of bushings 24 extending outwardly of link plates 24 as shown in FIG. 4. Any suitable mechanism or mechanisms may be employed at Station A (FIG. 3) and leading to Station A in order to feed link plates 20, bushings 24, and rollers 32 thereto and in order to align same, assemble same together so as to present the sub assembly of FIG. 4, and discharge same.

After being processed at Station A the primary or roller link assembly 12 may either be used as it or stored or directly fed to a Station B. At Station B the protruding extremeties 50 of bushings 24 are flowed over, at substantially right angles to the longitudinal axis of bushings 24, to form rims or flanges 36 by spinning operation using suitable tooling and mechanisms 52. All four bushing extremeties may be flowed over simultaneously or they may be done one extremety at a time with proper advancing of link assembly 12 to accomodate such action. It is preferred to set up Station B in two stages B-I and B-II. At B-I two opposed tools 52-I, operate simultaneously on ends 24-4 and 24-3 respectively of a bushing 24; while at Station B-II two opposed tools 51-II operate simultaneously on ends 24-I and 24-2 respectively of a bushing 24. It being noted that bushing ends 24-1 and 24-3 are not flowed over at Station B-I and ends 24-3 and 24-4 have been flowed over by the time they reach Station B-II having been so done previously at Station B-I.

Figure 5:
FIG. 5 is a partial sectional view of a modified configuration for the flange on the bushing of FIG. 1.

The ends of bushings 24 after being so flowed over should appear as shown in FIG. 1 they may however appear as shown in FIG. 5. Either configuration is acceptable and will function properly.

Thereafter link assemblies 12 may either be stored or directly fed to Station C wherein secondary or pin link plates 42 and pins 40 are assembled to link assemblies 12 to form chain 10. This operation may be accomplished by utilizing sub-assemblies comprising a single link plate 42 with a pair of pins 40 fixedly secured thereto and extending therefrom. The pins 40 are inserted through successive bushings 24 of adjacent roller link assemblies 12 so that a single link 42 overlaps adjacent link assemblies 12. A link plate 42 is then disposed about the free ends of such pins 40 and secured in place by any suitable process to prevent separation thereof.

From the above descritpion it will thus be seen that there has been provided a novel and improved chain and method of manufacturing such chain which chain incorporates primary link assemblies having bushings formed to extend outwardly of the link plates and/or with flanges thereabout to prevent walking of the link plates outwardly with respect to the bushings, said extensions and/or flanges furthermore automatically spacing the surfaces of the link plates of successive link assemblies from each other by a predetermined distance; and which method of manufacture involves assembling the bushings to the link plates with an interference fit, so that they extend outwardly of the link plates, and so that the bushings when desired are flowed over to form the flange about the link plate apertures; all in a reliable, simple, and relatively inexpensive manner.

It is understood that although I have shown the preferred form of my invention that various modifications may be made in the details therof without departing from the spirit as comprehended from the following claims.

We claim:

1. A chain link assembly: comprising
   a. at least one link plate;
   b. at least one aperture in said link plate; and
   c. a rigid bushing extending from one side of said link plate through said aperture and beyond said link plate a predetermined amount which overlies said link plate.

2. The chain link assembly of claim 1: wherein the edge portion of said bushing which overlies said link plate is flowed over at a predetermined angle outwardly with respect to the longitudinal axis of said bushing to form a flange disposed proximate the side surface of said link plate.

3. The chain link assembly of claim 2: wherein said angle is substantially at right angles to the longitudinal axis of said bushing.

4. The chain link assembly of claim 2: wherein said flange is continuous and substantially encircles said aperture in said link plate through which said bushing extends.

5. The chain link assembly of claim 1: wherein said bushing has an interference fit with said link plate 6. The chain link assembly of claim 2: wherein said flange is continuous and completely encircles said aperture in said link plate through which said bushing extends.

7. The chain link assembly of claim 1: wherein a roller is rotatably disposed about said bushing.

8. A chain link assembly: comprising
   a. a pair of link plates;
   b. at least one aperture in each of said link plates;
   c. a rigid bushing extending through said apertures of said link plates and interconnecting said link plates in spaced relationship with respect to each other; and
   d. said bushing having extremities at each end thereof extending beyond the outer surfaces of said link plates and overlying adjacent portions of the outer surfaces of the link plates.

9. The chain link assembly of claim 8: wherein said bushing extremities also extend outwardly with respect to the longitudinal axis of said bushing to form flanges that overlie the outer surfaces of said link plates and so as to prevent movement of said link plates away from each other.

10. The chain link assembly of claim 9: wherein there is a second aperture in each of said aligned link plates with a rigid bushing extending therethrough and having flanges that overlie said link plates.

11. The chain link assembly of claim 9: wherein said flange is continuous and encircles the edge of the aperture through which it extends.

12. The chain link assembly of claim 8: wherein said bushing has an interference fit with the inner surfaces of said apertures in said link plates.

13. A chain: comprising
   a. a plurality of link assemblies;
   b. each of said link assemblies having a pair of opposed sides interconnected in space relationship by at least one rigid bushing;
   c. said bushing having ends extending beyond the outside surfaces of said sides and overlying adjacent portions of said sides; and
   d. pin means extending through said bushings to interconnect said link assemblies into a chain with said ends serving to space any elements of the chain disposed proximate said outer surface of said sides from said outer surfaces of said sides.

14. The chain of claim 13: wherein said bushing ends that overlie said sides are also formed into flanges and wherein said flanges serve said spacing function.

15. The chain of claim 14: wherein said pair of sides of each of said link assemblies are interconnected by a pair of bushings each of which has ends extending beyond the outside surfaces of said sides to overlie said sides and formed into flanges.

16. The chain of claim 13: wherein said pin means includes a pair of pins extending between said interconnecting a pair o plates such that one of said pins extends through a bushing in one link assembly and the other of said pins extends through a bushing in another link assembly to thus interconnect said link assemblies by said pin means; said ends spacing said outer surfaces of said sides of said link assemblies from the inner surfaces of said plates of said pin means.

17. The chain of claim 16: wherein said bushings are assembled to said sides of said link assemblies with an interference fit.

18. The chain of claim 17: wherein rollers are disposed rotatably about said bushings.

* * * * *